Jan. 22, 1957     O. W. LUEK ET AL     2,778,295
BALE METERING MECHANISM
Filed May 14, 1954     5 Sheets-Sheet 2
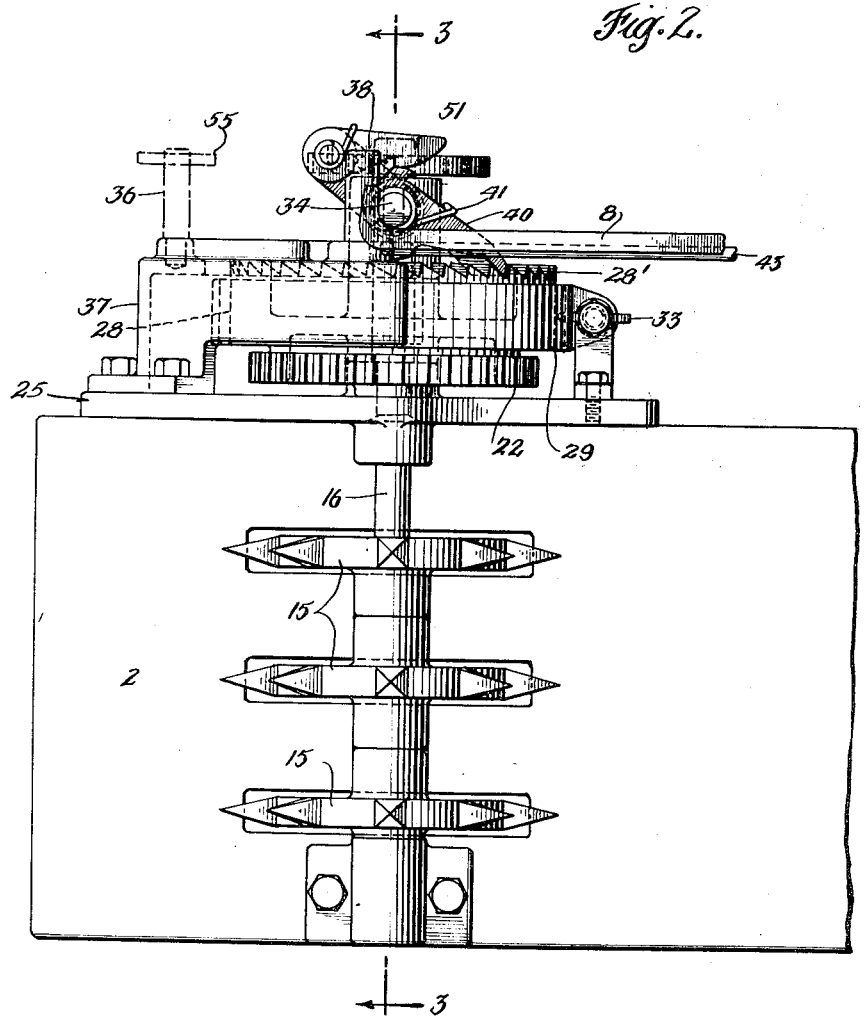
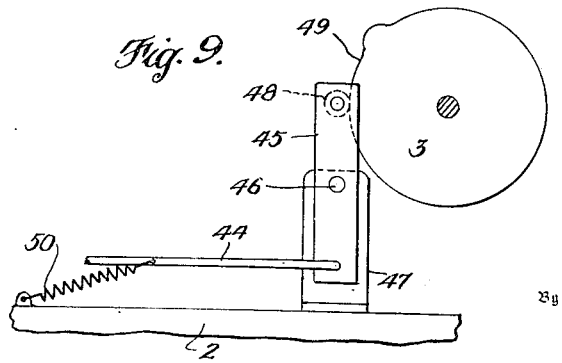
Inventor
Otto W. Luek
John P. Tarbox
Richard E. Babcock Jr.
By
Attorney

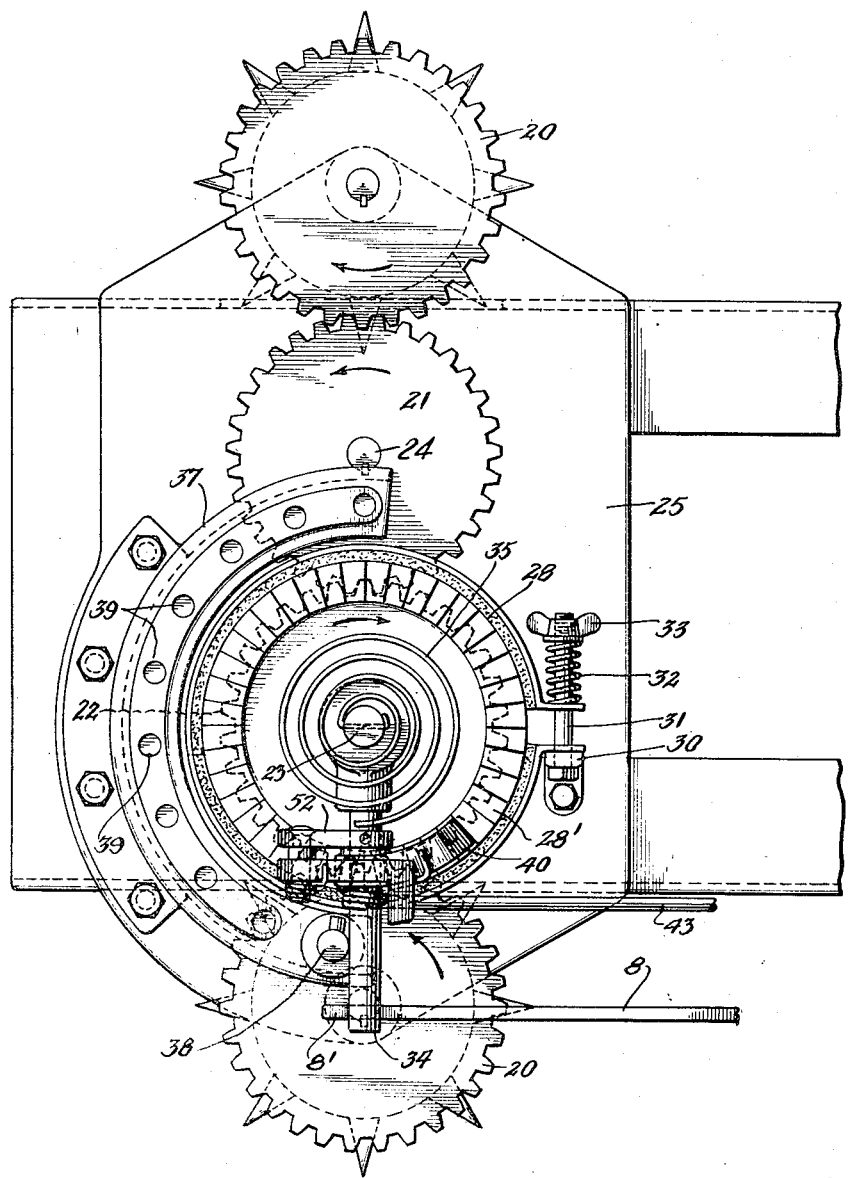

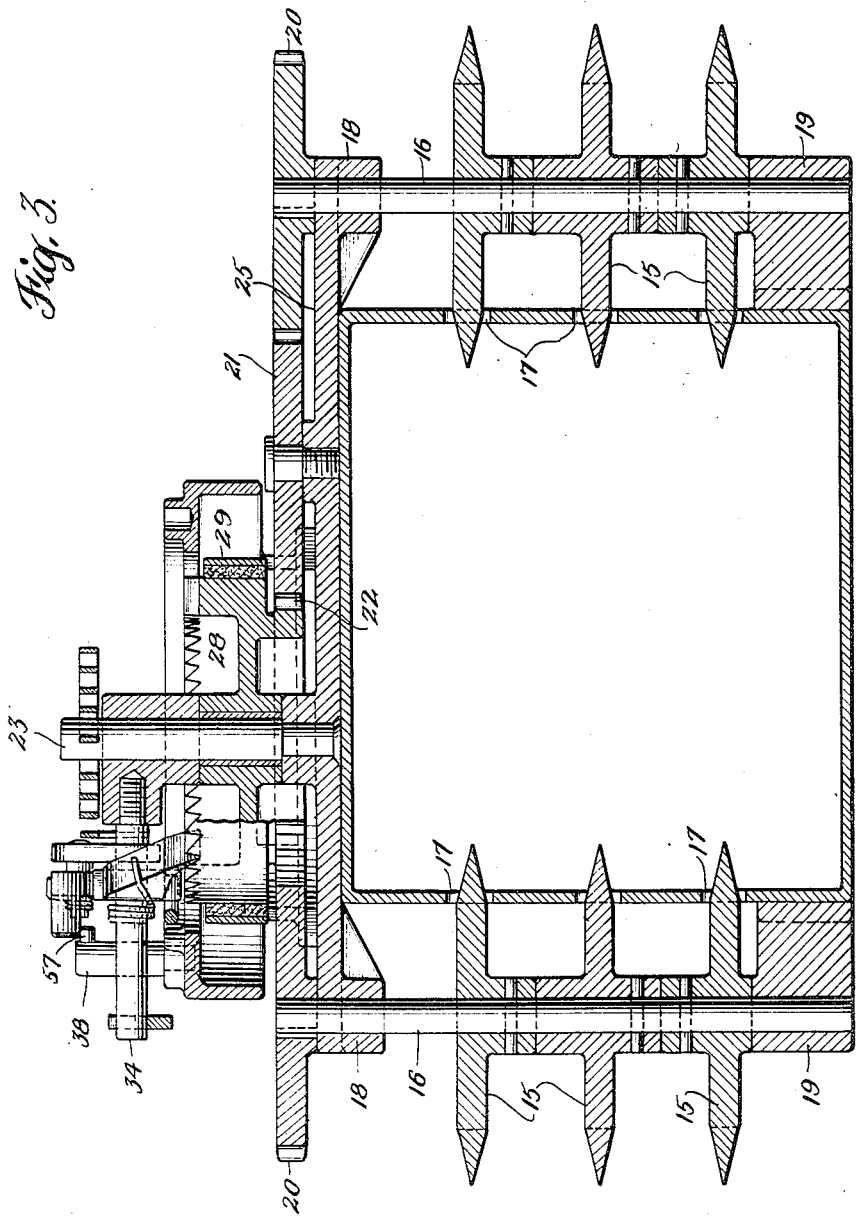

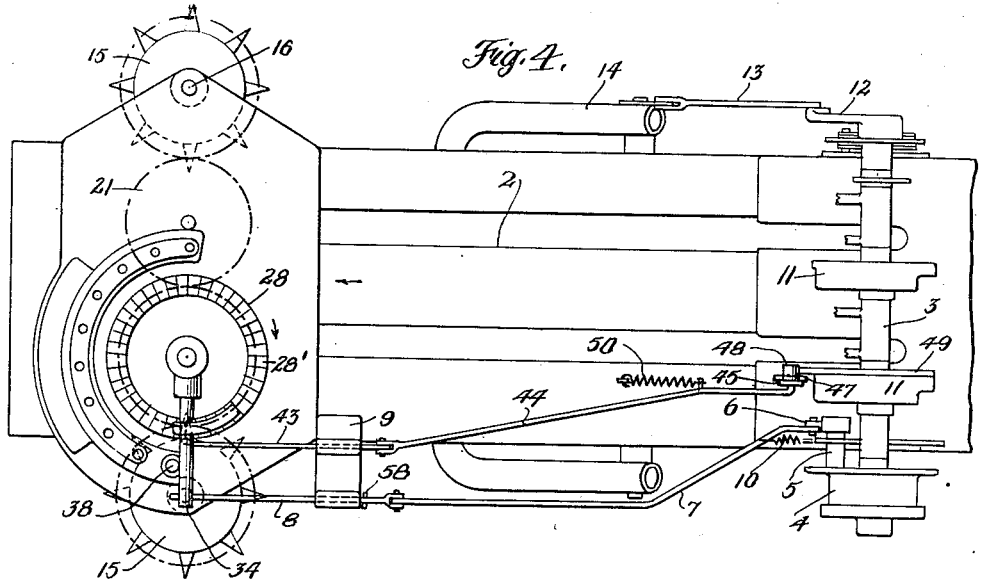
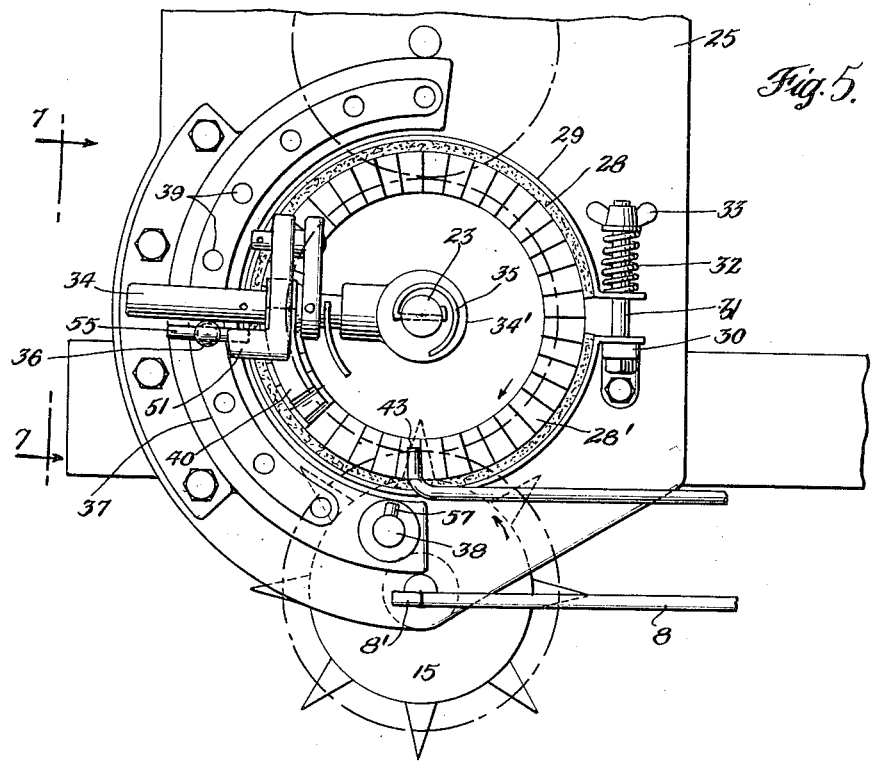

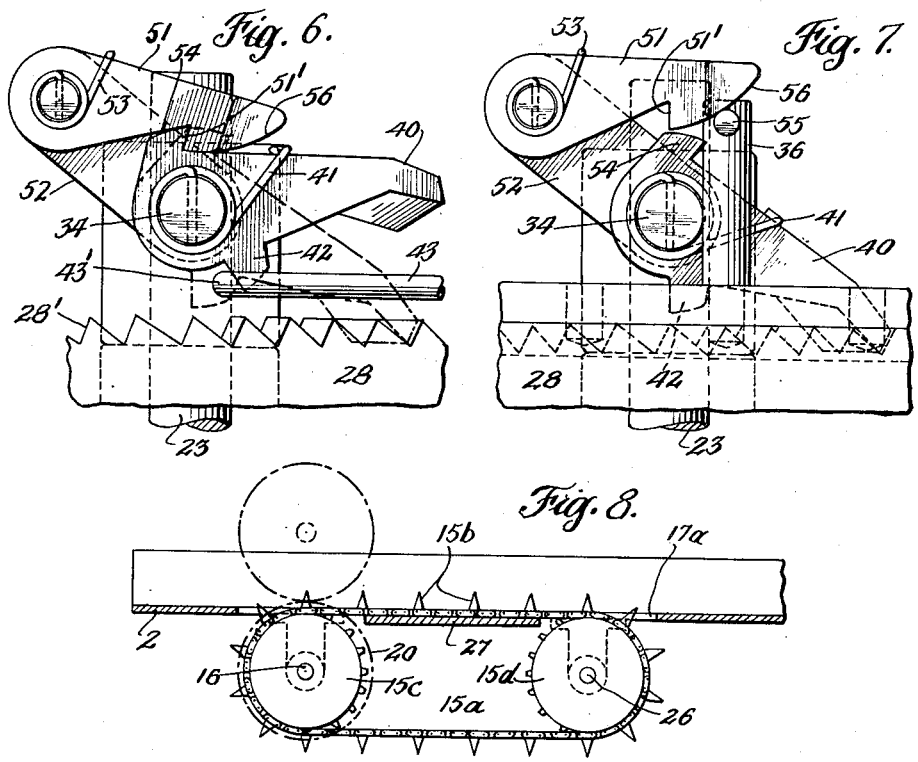

United States Patent Office 2,778,295
Patented Jan. 22, 1957

2,778,295

BALE METERING MECHANISM

Otto W. Luek, New Holland, and John P. Tarbox, Philadelphia, Pa., assignors, by mesne assignments, to Sperry Rand Corporation, New Holland, Pa., a corporation of Delaware Application May 14, 1954, Serial No. 429,818

19 Claims. (Cl. 100—4)

This invention relates to a bale length metering mechanism for use in automatic hay balers. Such a mechanism is particularly adapted for use in connection with automatic hay balers of the type in which bales of hay or the like are built up of successive charges of material which are compressed in a bale chamber by a reciprocating plunger or the like, the successive charges of hay forming each bale being successively compacted against the material already in the chamber and movement of the baled material through the chamber being retarded or opposed in a suitable manner to secure the desired degree of compaction of the completed bales. When successive charges of material have been compacted to form a bale of the desired length, it has been customary for a bale length metering mechanism to trip a one revolution clutch which actuates the bale banding mechanism.

It has long been desired to render such automatic hay balers capable of producing bales of close uniformity in length to facilitate the efficient stacking of the bales such as is desired either for transportation in vehicles, for proper arrangement in hay driers, or for storage.

However, in bale length metering mechanisms as heretofore employed, the primary bale metering element has generally consisted of a metering wheel which rotates continuously in the same direction in engagement with the bales and responsive to the movement of bales through the bale chamber. Where the last charge of material forming a given bale is heavier than usual, the action of the plunger on this heavier and larger charge moves the entire bale further through the chamber than is desired, and thus, forms a bale of greater than usual length. In addition, such unusually great movement of the bale rotates the metering wheel beyond its tripping point to move it part way through the metering cycle for the next bale with resulting inaccuracies in the length of the next bale.

Thus, by way of summation, it may be said that prior bale length metering mechanisms have been unable to produce bales of uniform length due both to movement of some of the bales beyond their usual tying position in the bale case and also to variations in the starting position of the primary metering element.

With the foregoing considerations in mind, it is the primary object of the invention to provide a bale metering mechanism for use in conjunction with an automatic baler to produce bales of greater uniformity of length than has heretofore been possible. This object is attained through the use of a metering mechanism in which means actuated by the primary metering element functions upon completion of a bale to prevent any movement of that bale beyond a predetermined position in the bale chamber. Thus, unusually heavy final charges of material in any given bale are required to be sufficiently compressed into the remainder of the bale to bring same to the desired length, this following from the fact that the bale plunger advances to a predetermined position on its compressing stroke. In addition, following completion of the banding cycle for a given bale, the primary metering mechanism is automatically returned to a predetermined starting point from which it commences its next metering cycle.

It is also an important object to provide such a mechanism in which the bale tensioning or retarding mechanism functions as the drive means for the metering mechanism and in which the bale retarding mechanism may be immobilized under control of the primary metering element to positively bar bale movement after the metering element reaches the end of its metering cycle for any given bale. To this end, there is provided a metering arm swingable about a fixed axis on the baler, this metering arm being connected by suitable clutch means to the bale retarding mechanism for movement into actuating engagement with the trip means to institute actuation of the banding mechanism. A stop positioned for engagement by the metering arm at the completion of the metering cycle acts through said arm and its connection with the bale retarding mechanism to immobilize said mechanism and thus secure the bales against movement during completion of the banding operation. Means is provided for disconnecting the metering arm from the bale retarding mechanism near the conclusion of the banding cycle and the metering arm is then returned to its starting position preferably by a resilient energy storing means. Preferably as an incident to its return to its starting position the metering arm is automatically reconnected to the driving mechanism for movement toward the trip means during formation of a succeeding bale.

The invention also envisages a novel means for automatically breaking and reestablishing the driving connection between the drive mechanism and the metering arm. To this end the preferred form of drive mechanism includes a ratchet wheel rotating therewith, the metering arm carrying a pawl normally in operative engagement with the ratchet wheel whereby the ratchet wheel and arm will move together toward the trip means to initiate the tying cycle. A suitable linkage connected with and driven from the tier mechanism during its operation then disengages the pawl from the ratchet wheel, and latch means maintains it in disengaged position while it is returned rearwardly to its starting point by resilient energy storing means. The ensuing return movement of the arm toward its starting position then carries the latch means into engagement with a fixed control member at the starting point which causes it to release the pawl for reengagement with the ratchet wheel.

It is a still further object to provide means for adjusting the mechanism of the invention whereby it may meter bales of different uniform lengths.

All of the foregoing objects and advantages are attained by the preferred embodiment of the invention illustrated in the accompanying drawings in which:

Figure 1 represents a plan view of the bale metering mechanism of the invention as applied to the bale case of a conventional automatic baler, such bale case being shown in part only;

Figure 2, a side elevation of the structure shown in Figure 1;

Figure 3, a cross-section on the line 3—3 of Figure 2 looking in the direction of the arrows;

Figure 4, a more or less diagrammatic plan view on a somewhat reduced scale showing parts of the banding mechanism of the baler and the manner in which the metering mechanism of the present invention is interconnected therewith;

Figure 5, an enlarged fragmentary plan view of the metering arm and the parts or elements associated therewith;

Figure 6, a greatly enlarged fragmentary elevation showing the manner in which the driving pawl is automatically disengaged from the ratchet wheel and latched in its disengaged position;

Figure 7, a similarly enlarged fragmentary elevation showing the metering arm at the return to its starting position with the pawl reengaged with the ratchet wheel to establish a driving connection between the ratchet wheel and the metering arm;

Figure 8, a diagrammatic view illustrating the modified form of the bale gripping element of the bale tensioning or retarding mechanism;

Figure 9, a fragmentary side elevation showing the manner in which the banding mechanism drive shaft is linked to the driving pawl.

Referring now in detail to the accompanying drawings and first considering Figure 4, it will be seen that the invention is adapted for use with a conventional type of automatic hay baler embodying a bale casing 2. This casing is of generally tubular hollow construction adapted to have successive wads or charges of hay introduced therein at any suitable point and compressed into bales by a longitudinally reciprocating plunger, each bale being compressed against a preceding bale and moved lengthwise through the bale casing against a suitable resistance or bale retarding force which may be exerted to control the density of the completed bales. It will be understood that when a sufficient number of wads or charges of material have been compressed to form a bale to the desired length, a suitable bale banding mechanism comes into operation to band the bale in well known manner. Such a mechanism is shown in part only in Figure 4, comprising a main shaft 3 rotatably supported across the top of the bale casing, this shaft 3 normally being at rest and being driven through a usual one revolution and stop clutch 4 which, in turn, is driven through any suitable mechanism, (not shown) the arrangement being such that one revolution of the shaft 3 causes the banding mechanism associated therewith to perform a complete banding cycle. The one revolution clutch 4 is tripped through movement of a rock shaft 5 having a crank arm 6 connected by a link 7 to one end of a trip rod 8 which is slideably supported in a slide bearing 9 on bale case 2. The arrangement is such that movement of the trip rod 8 to the left in Figure 4 will institute actuation of the one revolution clutch whereby the shaft 3 may be caused to rotate through one revolution corresponding to one complete banding cycle of the banding mechanism. A spring 10 connected between the link 7 and the bale casing tends to return the rock shaft 5 to its starting position.

It will be seen that in addition to the shaft 3, the banding mechanism includes control elements 11 rotatable with said shaft for controlling the operation of the several component parts (not shown) of the banding mechanism, also the shaft 3 acts through a crank 12 and link 13 to oscillate a needle yoke 14 to project the strands of banding material around the end of the bale and in position for engagement by the knotting mechanism as will be readily understood.

The metering mechanism of the invention is driven through means operative responsive to movement of bales through the baler whereby the metering mechanism will be driven to an extent proportional to the bale movement to accurately measure the bale lengths.

Such means is exemplified in the preferred embodiment by the peripherally toothed wheels or bale engaging elements 15 (as illustrated in Figure 2) keyed on shafts 16—16 on opposite sides of the bale case 2 and projecting through slots 17 in the sides of the bale case to operatively engage and penetrate the opposite sides of bales passing through the bale case. It will be noted that the toothed peripheries of the wheels 15 project substantially into the bale case to penetrate, and thus, firmly grip the sides of the bales so that on the one hand the bale movement will cause the wheels 15 to rotate, and on the other hand, a retarding or locking of the wheels 15 against rotation will result in a similar retarding or stoppage respectively of the bale movement. The shafts 16—16 are rotatably supported respectively in bearings 18—19 on opposite sides of the bale case 2. Keyed on the upper ends of the respective shafts 16 are gears 20—20 which are interconnected for equal and opposite rotation through gears 21 and 22 journaled on pivots 23 and 24 fixed on a base plate 25, the base plate being secured across the top of the bale case 2. The upper shaft bearings 18—18 may be conveniently formed as integral laterally projecting portions of such base plate 25, while the lower shaft bearings 19—19 may be incorporated in brackets secured to the lower edges of the bale case sides.

In the event it is desired to obtain an increased gripping action on the bales, each of the bale engaging elements may be formed as shown in Figure 8 to comprise an endless chain 15a equipped with bale penetrating teeth 15b and guided about sprockets 15c and 15d supported respectively on shafts 16 and 26, the shaft 16 bearing the gear 20 in mesh with one of the gears 21 or 22 as in the preferred arrangement. One run of the toothed chain 15a will be disposed for operative engagement with the bales through a longitudinal slot 17a in the bale case 2 and will be maintained in such engagement throughout its length by a rigid backing plate 27 which is slideably engaged by the chain. Although only one such modified bale engaging element on one side of the baler is shown, it will be understood that the corresponding element on the other side of the bale case will be similarly modified.

Fixed coaxially on the same hub as the gear 22 is a wheel 28, the smooth periphery of which functions as a brake drum for frictional engagement with a flexible brake shoe 29 disposed therearound in usual manner. Rotation of the brake shoe 29 with the wheel 28 is prevented by attaching the ends of the brake shoe to a bracket 30 (see Figure 5) fixed on the base plate 25 preferably by means of the same bolt 31 which interconnects and is slideably disposed through the opposite ends of the brake shoe. A compression spring 32 interposed between one end of the brake shoe and an adjusting thumb nut 33 threaded on the bolt resiliently maintains the brake shoe 29 in constant frictional engagement with the wheel 28.

Obviously, the restraining frictional drag of the brake shoe 29 on wheel 28 may be varied as desired by appropriate adjustment of the nut 33. This frictional drag is transmitted through the gears 22, 21, 20, and shafts 16—16 to the toothed wheels 15 to cause them to equally resist or retard the movement of bales through the bale chamber and thus to govern the bale density.

At this point it is deemed proper to state that the preferred embodiment of adjustable bale retarding and tensioning means above disclosed is substantially disclosed in the pending application of Edwin B. Nolt Serial No. 301,863, filed July 31, 1952, for Bale Tension Regulator now Patent No. 2,686,467, granted August 17, 1954. It therefore constitutes no part of the present invention except insofar as it cooperates in combination with the mechanism hereinafter described.

The primary metering element of the present invention comprises a metering and tripping arm 34 freely rotatably journaled at 34' on the pivot post 23 above and coaxially with the wheel 28. Suitable resilient means such as the spiral spring 35 shown in Figure 1 and interconnected between the fixed pivot post 23 and the arm 34 urges said arm in a counter-clockwise direction away from the trip rod 8 and into abutting engagement with the stop post or pin 36 shown in Figure 5 and in broken lines in Figure 2. This pin or post 36 is fixedly supported in an arcuate bracket 37 secured on base plate 25. Such a pin or stop 36 determines the starting position of the arm 34 from which it is swung in a clockwise direction toward the up-turned end 8' of trip rod 8 to engage said trip rod and through it initiate a tying cycle of the tying mechanism.

A fixed stop or pin 38 is positioned on the base 25 to engage the arm 34 after it has moved the trip rod 8 sufficiently to trip the one revolution clutch 4 and initiate the tying cycle.

In order to vary the range of swinging movement of arm 34, and thus, the length of the metered bales (it being understood that the bale lengths will vary in proportion to variations in the arc of travel of arm 34), it is desirable to render the position of the stop 36 adjustable. Thus, in the present embodiment the stop 36 may be selectively fixedly positioned in any of an arcuate series of holes 39 in bracket 37 at various positions along the arc of movement of arm 34. The lower end of stop 36 adapted for reception in holes 39 is preferably somewhat tapered to frictionally wedgingly engage the sides of the holes and be thus held firmly against rotation. Or alternatively the holes and stop may be of similar non-circular cross-section.

Since the wheel 28 and its associated mechanism are driven proportionally and in response to movement of the bales through the baler, this wheel is well adapted for use as a driving element to drive the arm 34 into actuating engagement with the trip rod. According, there is provided a clutch mechanism operative to establish a disengageable driving connection between the arm 34 and the driving wheel or element 28. To this end, the wheel 28 is provided with an annular series of ratchet teeth 28' directed axially toward the arm 34 and the arm 34 carries a pawl 40 pivoted thereon as shown in Figure 7 and normally urged by a spring 41 into operative engagement with the ratchet teeth 28'.

The cooperation between the pawl 40 and the ratchet teeth 28' is such that when these elements are operatively engaged, as in Figure 7, the arm 34 will be caused to rotate with the wheel 28 from its starting position against the stop 36 (see Figure 5) in a clock-wise direction into actuating engagement with the trip rod 8 to initiate a banding cycle of the banding mechanism. Such rotation of the arm 34 will, of course, tend to store energy in the spring 35 for effecting the subsequent retraction of the arm back to its starting point. However, before such return movement can commence, it is necessary that the driving connection between the arm 34 and wheel 28 be disengaged.

For this purpose, there is provided means responsive to actuation of the banding mechanism for disengaging the said driving connection near the end of the banding cycle. Accordingly, as shown in Figures 6 and 7, the pawl 40 is provided with a depending catch 42 positioned for engagement by the laterally projecting boss 43' of a release rod 43 which is guided for movement in the slide bearing 9. When at rest, the rod 43 is so positioned that its boss 43' lies rearwardly and clear of the catch 42. However, when the rod is pulled forwardly through the slide 9, or to the right in Figure 7, it will operatively engage catch 42 to swing the pawl 40 upwardly out of engagement with the ratchet teeth 28'.

The rod 43 is connected by a link 44 to the lower end of a lever 45 medially fulcrumed at 46 to a bracket 47 on bale case 2 as shown in Figure 10. A roller 48 carried at the upper end of this lever is operatively engaged with a cam 49 (see Figure 4) fixed on the tier shaft 3 (preferably on or in connection with a control member 11) for rotation therewith. A spring 50 connected under tension between the bale case 2 and the link 44 serves to bias the link in a direction to maintain the roller 48 in engagement with the cam 49. The conformation of cam 49 is such as to swing the lever 45 in a counterclockwise direction, and thus, draw the rod 43 to the right to disengage pawl 40 at a point in the banding cycle when the band has been sufficiently completed to retain the newly formed bale in its compressed condition.

It will be seen that the fixed stop 38 serves to accurately position the metering arm 34 for proper cooperation between the pawl 40 and release rod 43. Moreover, the stop 38 performs the additional highly important function of acting through the metering arm 34, ratchet wheels 28, gears 22, 21, 20—20 and shafts 16—16 to lock the toothed wheel 15 against rotation. Through them the bale itself is positively held against further movement. Thus, in the event the final charge of material compressed into any bale is unusually heavy or bulky, it nevertheless, will not result in a bale of increased length, since the locking of the toothed wheels 15 in engagement with the bale will necessitate that the bale be compressed into the desired length even though the overall density of the bale is correspondingly increased. The resulting variations in bale density, however, will be relatively small and in any event, variations in density are preferable to variations in length of the respective bales.

Following its raising by the release rod 43 the pawl 40 is held in its raised disengaged position by a latch 51 in order to permit retraction or return of the arm 34 to starting position through the action of spring 35. Referring to Figures 6 and 7 it will be seen that the latch 51 is pivoted on a support 52 fixed to metering arm 34 and is resiliently urged toward the pawl by a spring 53. Latch 51 is so arranged that its hooked end 51' engages behind an abutment or detent on the pawl 40 when the latter is raised by the release rod 43.

The latch 51 then holds the pawl 40 disengaged from the ratchet teeth 28' during return of arm 34 to its starting position in abutment with adjustable stop 36. In order that the clutch means or pawl 40 may then reengage the ratchet wheel 28, the stop 36 is provided with a lateral trip arm or projection 55 which cooperates with a cam surface 56 on the latch 51 incident to return movement of the metering arm 34. The coaction between trip arm 55 and the cam surface 56 is such as to raise the latch 51 clear of the catch 54 and thereby release the pawl 40 so that its spring may again urge it into operative engagement with ratchet teeth 28'.

It will be seen that through selective positioning of the adjustable stop 36 the arm 34 may be caused to meter bales throughout a substantial range of lengths which, however, will be smaller than the maximum bale lengths obtainable through use of the invention. In order to set the mechanism for metering bales of maximum length, the adjustable stop 36 is removed completely as in Figure 1, and the fixed stop 38 may then be employed to determine both the starting and finishing positions of the metering arm. The fixed stop 38 is preferably adapted for such use by providing it with a trip arm 57 corresponding to the trip arm 55 of the adjustable stop and adapted for cooperation in the same manner with the latch 51 to release same and free the pawl 40 when the metering arm is retracted to its starting position. It will be apparent that such dual use of the fixed stop 38 will permit swinging of the metering arm through an arc of nearly 360 degrees to meter a correspondingly great bale length.

The overall operation of the invention which is believed to be readily apparent from the foregoing description is briefly summarized as follows:

At the start of the bale formation, in forming a bale of less than the maximum possible length, the metering arm is positioned against the stop 36 as in Figure 5 by the action of spring 35, the latch 51 having been released by cooperation with the trip arm 55 to permit pawl 40 to operatively engage ratchet wheel 28. As ratchet wheel 28 is rotated in a clock-wise direction incident to bale formation, through action of the bale metering and retarding elements 15, shafts 16, and gears 20, 21, 22, the metering arm 34 moves with it to the extent permitted by the stop 38.

Just before the metering arm reaches the stop 38 it engages the upwardly turned end 8' of clutch trip rod 8 and actuates said rod to initate operation of the one revolution clutch 4 through which the conventional needles and knotter mechanism are driven for a complete banding cycle.

As the banding cycle nears completion, the cam 48 on tier shaft 3 (see Figures 4 and 10) acts through roller 48 on lever 45 to swing the upper end of said lever rearwardly about its medial fulcrum 46. Consequently, the link 44 then draws the slide rod 43 forwardly to swing the pawl 40 upwardly out of engagement with ratchet wheel 28 and into operative engagement with latch 51 which retains it in raised position.

As the arm 34 is then retracted by spring 35 away from fixed stop 38, and out of engagement with the upwardly turned end 8' of the clutch trip rod 8, the spring 19 restores trip rod 8 and clutch control arm 6 to a position to bring the clutch 4 to rest upon completion of its one revolution.

As continued retraction of the arm 34 moves it into abutment with the stop 36, the latch 51 will be raised by cooperation with trip arm 55 on said stop. This will release the pawl 40 for reengagement with ratchet wheel 28 to thus reconnect the metering arm 34 for rotation with said ratchet wheel during formation of the next bale.

Variation of the bale lengths metered by the arm 34 may be controlled as desired by selective positioning of the adjustable stop 36 in any of the holes 39. Where it is desired to obtain bales of maximum length, however, the adjustable stop 36 may simply be removed and its function taken over by the fixed stop 38 with its associated trip arm 57.

Irrespective of variations in size of the last charge of hay compressed into any bale or of the stage of compression of such charge when the metering arm 34 abuts against stop 38, the stop positively limits the bale movement beyond a predetermined point and thus requires that the last charge be compressed sufficiently to bring the bale within the desired length. In the event the last charge of hay in any given bale is somewhat lighter or heavier than usual, the bale will simply be compressed to a somewhat smaller or greater than normal density, but will, nevertheless, be formed to one and the same length.

Thus, in operation not only is the metering arm 34 always returned to the same predetermined starting point for measuring each bale, but in addition, neither the completed bale nor the metering arm is permitted to move beyond the predetermined finishing point which is the same for all bales whereby all bales are compressed to the same uniform length. This finishing point is marked by stop 38.

It will be apparent that the fixed stop 38 may be omitted if desired and its function taken over by the clutch trip rod 8 in which event the tripping movement of the rod 8 may be limited as by engagement between the slide bearing 9 and a stop pin 58 disposed transversely through such rod as in Figure 4. Such limitation of the rod movement will serve to similarly limit the movement of the metering arm 34 for the same purpose as mentioned in connection with the fixed stop 38. As in the case of the fixed stop 38, the rod 8 will position metering arm 34 for proper cooperation between the pawl release rod 43 and pawl 40.

In addition to the various other features and advantages above pointed out, it is believed clear that the invention provides an extremely simple and novel means for automatically disengaging the driving connection between the metering arm and driving element, returning the metering arm to its starting position, and reestablishing such driving connection for a further metering cycle.

In this application we have shown and described only the preferred embodiment of our invention, together with certain minor modifications, simply in order to set forth the best mode contemplated by us of carrying out our invention. However, we recognize that the mechanism disclosed and various of its elements may be modified in a number of ways, all without departing from our invention. Accordingly, the drawings and description herein are to be considered as merely illustrative in nature, and not as exclusive.

Having thus described our invention, we claim:

1. In an automatic baler having a banding mechanism adapted for actuation through a trip means, the combination comprising a metering and tripping element mounted on the baler for movement from a predetermined starting position into actuating engagement with said trip means, a bale retarding mechanism in driven interlocking engagement with the bales formed by said baler, mechanism establishing a disengageable driving connection between said element and the bale retarding mechanism whereby said element may be moved by said retarding mechanism into actuating engagement with the trip means, and means immobilizing said element as it engages and actuates said trip means, said driving connection remaining operative during such immobilization to secure said bale retarding mechanism against movement during said immobilization.

2. The combination of claim 1 in which the immobilizing means comprises a stop positioned on the baler for engagement by said element following its actuating engagement with the trip means.

3. The combination of claim 1 in which said immobilizing means is carried by the trip means.

4. The combination of claim 1 including means responsive to actuation of the banding mechanism for disengaging said driving connection, and resilient means for returning said element to its starting position.

5. The combination of claim 4 including means for reengaging said driving connection responsive to return of the element to its starting position.

6. In an automatic baler of the class in which bales are successively formed and moved therethrough, said baler having a banding mechanism adapted for actuation through a one revolution clutch having a trip means, the combination of mechanism for actuating said trip means responsive to the movement of bales through said baler comprising a metering and tripping element mounted on said baler for movement into actuating engagement with said trip means, a stop displaced from said trip means, resilient means normally urging said element away from said trip means and toward a starting position in abutment with said stop, a rotary drive element, bale engaging means rotating said drive element from said stop toward the trip means responsive to bale movement, mechanism normally establishing a disengageable driving connection between said metering and tripping element and the drive element whereby said metering and tripping element may be caused to move into actuating engagement with the trip means to institute actuation of the banding mechanism, means responsive to actuation of said banding mechanism for disengaging said driving connection to permit return of said metering and tripping element to its starting position by the resilient means, and means for reengaging said driving connection responsive to return of the element to its starting position.

7. In an automatic baler of the class in which bales are successively formed and moved therethrough, said baler having a banding mechanism adapted for actuation through a trip means, the combination comprising a metering and tripping arm mounted for rotary movement about a fixed axis on said baler from a predetermined starting position into actuating engagement with said trip means, a rotary drive element, means operative responsive to the movement of bales through said baler for rotating said drive element, mechanism normally establishing a disengageable driving connection between said arm and the drive element, whereby said arm may be moved by the drive element into actuating engagement with the trip means to initiate actuation of the banding mechanism, means responsive to actuation of the banding mechanism for disengaging said driving connection, latch means for retaining said connection disengaged, resilient means operative to retract said arm to its starting position upon disengagement of said driving connection, and means operative to release said latch means responsive to return of the arm to its starting position.

8. In an automatic baler of the class in which bales are successively formed and moved therethrough, said bales having a banding mechanism adapted for actuation through a trip means, the combination comprising a metering element mounted for movement on said baler from a predetermined starting position into actuating engagement with said trip means, a rotary drive element, means for actuating said drive element, mechanism normally establishing a disengageable driving connection between said metering element and the drive element, whereby said metering element may be moved by the drive element into actuating engagement with the trip means to initiate actuation of the banding mechanism, means responsive to actuation of the banding mechanism for disengaging the said driving connection, latch means for retaining said connection disengaged, means operative to retract said metering element to its starting position upon disengagement of said driving connection, and means operative to release said latch means responsive to return of the metering element to its starting position.

9. The combination of claim 8 wherein said means for actuating the drive element is operative responsive to movement of bales through the baler and said means for retracting the metering element to its starting position is resilient.

10. In an automatic baler having a banding mechanism adapted for actuation through a one revolution clutch having a trip means, the combination comprising a metering and tripping arm mounted for rotary movement about a fixed axis on said baler from a predetermined starting position into actuating engagement with said trip means, a rotary drive element, means for rotating said drive element, mechanism normally establishing a disengageable driving connection between said arm and the drive element whereby said arm may be moved by the drive element into actuating engagement with the trip means to initiate actuation of the banding mechanism, means operative responsive to actuation of the banding mechanism for disengaging the said driving connection near the end of said actuation of the banding mechanism, latch means for retaining said connection disengaged and means operative to retract said arm to its starting position upon disengagement of said driving connection.

11. The combination of claim 10 including means operative to reestablish said driving connection responsive to return of the arm to its starting position.

12. Bale metering and tripping mechanism for a baler of the class in which bales are successively formed and moved therethrough, said bales having a banding mechanism adapted for actuation through a one revolution clutch having a trip means, comprising a metering and tripping arm mounted for rotary movement about a fixed axis on the baler from a predetermined starting position into actuating engagement with said trip means, a driving element comprising a ratchet wheel rotatable on said baler coaxially with said arm, means operative responsive to the movement of bales through the baler for rotating the ratchet wheel, clutch mechanism establishing a disengageable driving connection between said arm and the driving element whereby said arm may be moved by the driving element into actuating engagement with the trip means to initiate actuation of the banding mechanism, said clutch mechanism comprising a pawl pivotally supported by said arm for operative engagement with said ratchet wheel, means responsive to actuation of said banding mechanism for disengaging said driving connection near the end of the actuation of the banding mechanism comprising a link connected to the banding mechanism for movement responsive to actuation of the latter, said link being disposed to retract said pawl from the ratchet wheel, a spring loaded latch operable to retain said pawl disengaged from the ratchet wheel, a stop fixed on said bale in the path of movement of said arm to determine its predetermined starting position, said stop being adjustable to various positions circumferentially of the ratchet wheel, resilient means operative to retract said arm to its starting position against said stop upon disengagement of said driving connection, and means operative to reestablish said driving connection responsive to return of the arm to its starting position comprising cooperating cam means carried by said stop and said latch respectively, to disengage said latch from the pawl as the arm approaches said stop.

13. The combination of claim 12 wherein said means operative responsive to movement of the bales through the baler for rotating the ratchet wheel comprises toothed wheels respectively in operative engagement with opposite sides of the bale moving through said baler for rotation responsive to movement of said bale, and gear means rotatably interconnecting said toothed wheels with said ratchet wheel.

14. Bale metering mechanism for a baler of the class in which bales are succesively formed and moved therethrough, said bales having a banding mechanism adapted for actuation through a one revolution clutch having a trip means, comprising a metering and tripping arm mounted for rotary movement about a fixed axis on the baler from a predetermined starting position into actuating engagement with said trip means, a driving element comprising a ratchet wheel rotatable on said baler coaxially with said arm, means operative responsive to the movement of bales through the baler for rotating the ratchet wheel, clutch mechanism normally establishing a disengageable driving connection between said arm and the driving element whereby said arm may be moved by the driving element into actuating engagement with the trip means to initiate actuation of the banding mechanism, said clutch mechanism comprising a pawl pivotally supported by said arm for operative engagement with the ratchet wheel, and means responsive to actuation of said banding mechanism for disengaging the driving connection, said means being disposed to engage and retract said pawl from the ratchet wheel.

15. The combination defined in claim 14 including a spring loaded latch operable automatically to retain said pawl disengaged from the ratchet wheel and means operative to return said arm to its starting position responsive to disengagement of said pawl.

16. The combination of claim 14 including a spring loaded latch operable to retain said pawl disengaged from the ratchet wheel, a stop fixed on said baler in the path of movement of said arm to determine its starting position, and resilient means operative to retract said arm to its starting position against said stop upon disengagement of said driving connection.

17. The combination of claim 16 including a spring loaded latch operable to retain said pawl disengaged from the ratchet wheel, resilient means operative to retract said arm to its starting position upon disengagement of said driving connection, and means operative to reestablish said driving connection responsive to return of the arm to its starting position comprising cooperating cam means carried by said latch and by said baler respectively for disengaging said latch from the pawl responsive to return movement of the arm.

18. In a bale metering mechanism for a hay baler the combination comprising a metering and tripping arm mounted on the baler for rotary movement about a fixed axis from a predetermined starting position into actuating engagement with a trip means on the baler, a ratchet wheel coaxial with said arm and having ratchet teeth presented axially theretoward, means for rotating said wheel, a pawl pivotally supported by said arm for engagement with said ratchet teeth, a spring loaded latch carried by said arm and operable to retain said pawl disengaged from said ratchet teeth, a stop fixed on the baler in the path of movement of the arm, resilient means for urging said arm against the stop when the pawl is disengaged from said ratchet teeth, said latch and said stop being formed with cooperating cam means operable to release said pawl from the latch as the arm approaches said stop.

19. Mechanism of the character described comprising a ratchet wheel, means rotating same, an arm mounted for rotation coaxially with the ratchet wheel, disengageable clutch means for placing said arm in driven relation with said ratchet wheel, means for disengaging said clutch means at one extremity of rotational movement of the arm, resilient means for moving the arm in an opposite direction of rotation upon said disengagement, and means operable responsive to such opposite movement for re-engaging said clutch means after a predetermined extent of movement of the arm in said opposite direction.

References Cited in the file of this patent

UNITED STATES PATENTS

| | | |
|---|---|---|
| 878,051 | Eberhardt | Feb. 4, 1908 |
| 1,257,466 | Dudley | Feb. 26, 1918 |
| 2,263,628 | Nolt | Apr. 1, 1941 |
| 2,546,324 | Tuft et al. | Mar. 27, 1951 |

FOREIGN PATENTS

| | | |
|---|---|---|
| 498,315 | Germany | May 20, 1930 |